United States Patent [19]

Adams

[11] 3,723,548

[45] Mar. 27, 1973

[54] CHLOROMETHYLATION PROCESS

[75] Inventor: Frank S. Adams, Wyoming, Ohio

[73] Assignee: The Procter & Gamble Company, Cincinnati, Ohio

[22] Filed: Oct. 14, 1971

[21] Appl. No.: 189,277

[52] U.S. Cl. ..........................................260/651 HA
[51] Int. Cl. ...............................................C07c 25/14
[58] Field of Search ...............................260/651 HA

[56] References Cited

UNITED STATES PATENTS

| | | | |
|---|---|---|---|
| 3,652,689 | 3/1972 | Cier et al. | 260/651 HA |
| 2,951,100 | 8/1960 | Adams | 260/651 HA |
| 2,945,894 | 2/1960 | Earhart et al. | 260/651 HA |
| 3,069,480 | 12/1962 | Hirth et al. | 260/651 HA |
| 2,973,391 | 2/1961 | Earhart et al. | 260/651 HA |
| 3,336,402 | 8/1957 | Tueter | 260/651 HA |

FOREIGN PATENTS OR APPLICATIONS 1,067,988  5/1967  Great Britain ..................260/651 HA

*Primary Examiner*—Howard T. Mars
*Attorney*—Jack D. Schaeffer et al.

[57] ABSTRACT

An improved process for the chloromethylation of polyalkylbenzene employing a particular combination of chloromethylation agents, an emulsifier and specific reaction conditions.

6 Claims, 1 Drawing Figure

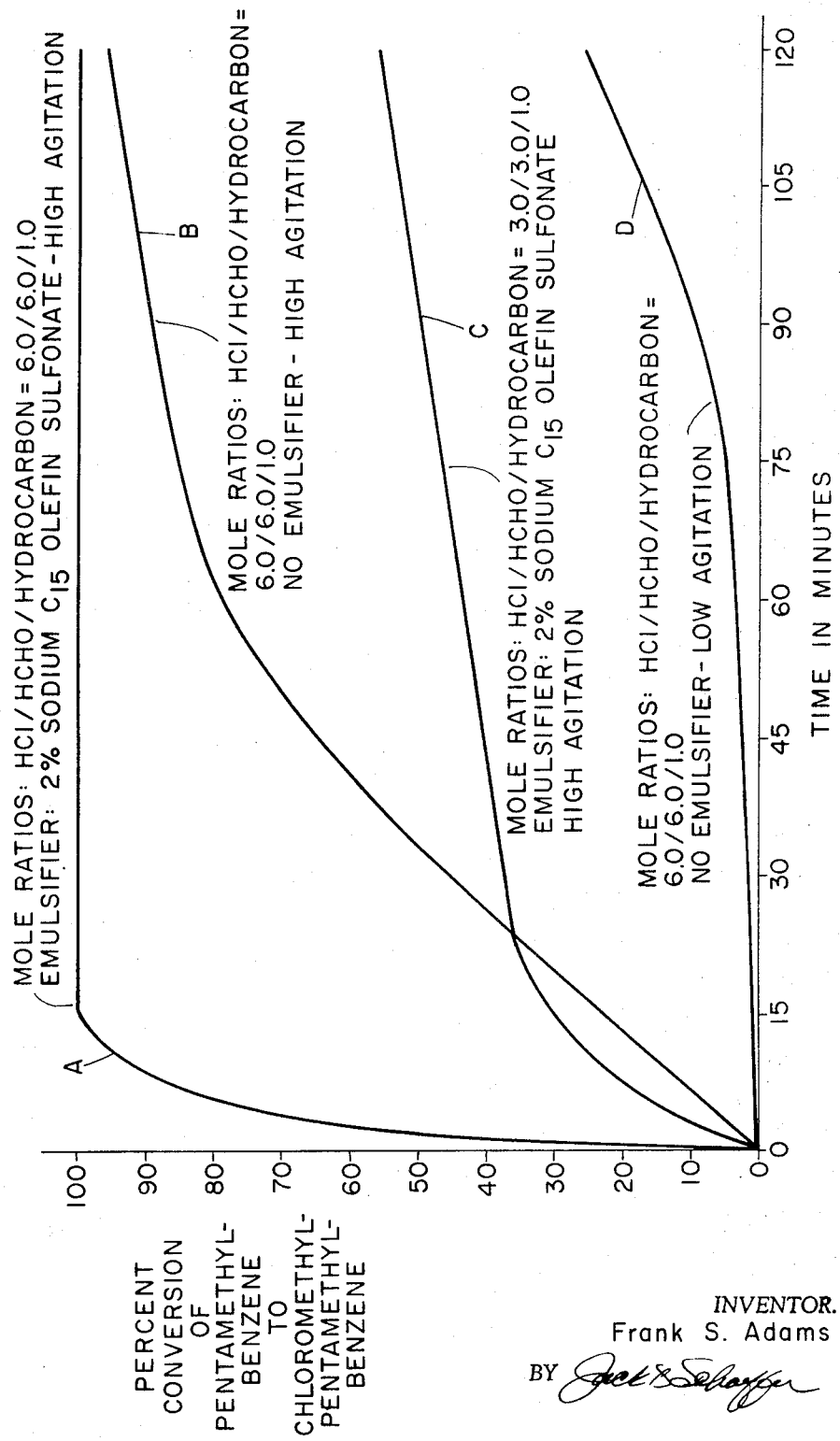

CHLOROMETHYLATION PROCESS

BACKGROUND OF THE INVENTION

The present invention relates to an improved process for the chloromethylation of polyalkylbenzene compounds. The process provides high yields of mono- and bis-chloromethylated polyalkylbenzenes after relatively short reaction times. By employing a particular combination of chloromethylation agents, i.e., hydrogen chloride and formaldehyde, in certain essential concentrations and by utilizing a particular amount of an emulsifier during the reaction, chloromethylation can be made to proceed efficiently under reaction conditions which are relatively inexpensive to maintain.

Chloromethylated alkyl substituted benzene compounds are useful intermediates in the production of benzene polycarboxylic acids which in turn can be employed as detergent builder materials. Methods for chloromethylating substituted benzene compounds are well known in the art. For example, British Patents 771,086, 786,382 and 1,026,365 and U.S. Pat. No. 2,945,894 describe chloromethylation processes employing hydrogen chloride and formaldehyde or paraformaldehyde. These processes are, for the most part, time consuming and inefficient or require catalysts or expensive high pressure reaction equipment.

Other more efficient chloromethylation processes have been devised but each is subject to certain engineering or material handling difficulties. British Patent 1,067,988, for example, discloses a process for the production of halomethyl aromatic compounds by reacting a substituted benzene compound with HCl and formaldehyde in the presence of an emulsifier. This process, however, requires maintenance of anhydrous conditions and consequently utilization of sophisticated equipment to handle the highly corrosive gaseous anhydous HCl. This process further requires use of a lithium chloride catalyst and an acetic acid cosolvent thereby creating additional handling and material separation difficulties. U.S. Pat. No. 2,951,100 discloses a chloromethylation process which eliminates the need for a catalyst but requires utilization of gaseous HCl and pressures above 100 psi thereby retaining the need for more expensive reaction equipment.

It is an object of the present invention to provide an improved process for the mono- or bis-chloromethylation of substituted benzene compounds. It is a further object of the present invention to provide such a chloromethylation process which does not require lengthy reaction times, high pressure corrosion-resistant reaction equipment, anhydrous conditions, chloromethylation catalysts, or reaction mixture cosolvents. It is a further object of the present invention to provide such a chloromethylation process by which commercially feasible yields of the chloromethylated product are obtained.

It has been discovered that by combining the use of standard chloromethylation agents in particular reactant concentrations with the use of a particular amount of an emulsifier, mono- and bis-chloromethylation of substituted benzene compounds can be accomplished in a manner which accomplishes the above-described objectives and which is unexpectedly superior to prior art chloromethylation processes.

SUMMARY OF THE INVENTION

The present invention provides an improved method for the production of mono- and bis-chloromethylated polyalkylbenzene compounds. The process comprises the steps of (A) forming a reaction mixture consisting essentially of (1) an aromatic hydrocarbon having the general formula

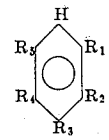

wherein $R_1$, $R_2$, $R_3$ $R_4$ and $R_5$ are, independently, hydrogen, alkyl of from one to about five carbon atoms, or haloalkyl of from one to about five carbon atoms, no more than one of the R groups being haloalkyl, (2) at least 6 moles of HCHO per mole of aromatic hydrocarbon, (3) at least 6 moles of HCl per mole of aromatic hydrocarbon, said HCl being in the form of an aqueous solution, and (4) an emulsifier which is stable in acid media, said emulsifier comprising from about 0.1 to 4.7 percent by weight of the total reaction mixture; and (B) agitating said reaction mixture to form an aqueous emulsion, while maintaining said reaction mixture at a temperature of from about 70° to 90° C and a pressure below 100 psia.

BRIEF DESCRIPTION OF THE DRAWING

The drawing illustrates reaction characteristics for several pentamethylbenzene chloromethylation processes under varying reaction conditions. The vertical axis represents the percentage of pentamethylbenzene feedstock present in the reaction mixture which has been converted to monochloromethyl pentamethyl benzene. The horizontal axis represents time in minutes. The four curves illustrate the speed and degree of conversion of various pentamethyl-benzene chloromethylation reactions under a variety of reaction conditions. Curve A presents results of chloromethylation employing the process of the instant invention in which an emulsifier, high agitation and chloromethylation agent to hydrocarbon mole ratios of at least 6 to 1 are employed. Curve B presents the results of chloromethylation under substantially identical conditions but without the emulsifier of the present invention. Curve C presents the results of a similar process carried out at high agitation with the emulsifier of the present invention but with chloromethylation agent (HCl and HCHO) concentrations considerably below that of the present invention. Curve D presents results of a process carried out at the reactant concentrations of the instant invention but without the requisite agitation and emulsifier.

DESCRIPTION OF THE DEVELOPMENT

The instant invention relates to an improved process for the production of mono- and bis-chloromethylated polyalkyl-benzene compounds. The aromatic hydrocarbon starting material for the improved process can be represented by the general formula:

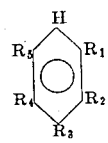

wherein $R_1$, $R_2$, $R_3$, $R_4$ and $R_5$ are, independently, hydrogen, alkyl of from one to about five carbon atoms, or haloalkyl of from one to about five carbon atoms, no more than one of the R groups being haloalkyl. Aromatic hydrocarbons containing more than one haloalkyl group are exceedingly difficult to chloromethylate and fall outside the scope of the present invention.

Examples of suitable aromatic hydrocarbons include benzene; toluene; 1,2-dimethylbenzene; 1,3-dimethylbenzene; 1,2,4-trimethylbenzene; 1,3,5-trimethylbenzene; 1,2,3-trimethylbenzene; 1,2,4,5-tetramethylbenzene; 1,2,3,4-tetramethylbenzene; pentamethylbenzene; 1-chloromethyl-3,5-dimethylbenzene; 1,3,5-triethylbenzene; 1,2,4-tripropylbenzene; 1,2,3-tributylbenzene; 1,2-dimethyl-4,5-dipentylbenzene; pentapropylbenzene; 1,2,3-trimethyl-4-chloromethylbenzene; 1,3-diethyl-4-butyl-5-methylbenzene; and 3-butylbenzene.

From the standpoint of commercial availability and cost, preferred aromatic hydrocarbons include pentamethylbenzene; toluene; 1,2-dimethylbenzene; 1,3-dimethylbenzene; 1,2,4-trimethylbenzene; 1,3,5-trimethylbenzene; 1,2,3-trimethylbenzene; 1,2,4,5-tetramethylbenzene; 1,2,3,4-tetramethylbenzene; 1-chloromethyl-3,5-dimethylbenzene; and 1,2,3-trimethyl-4-chloromethylbenzene. Feedstocks containing mixtures of polyalkylbenzenes of the type described above are readily available as by-products of petroleum refining operations.

The chloromethylation agents used in the instant process are formaldehyde and hydrogen chloride. Formaldehyde can be employed in any of its commercially available forms. For example, aqueous solutions of 37 percent (formalin), 45 percent and 50 percent are readily available commercially and can be employed in the instant process. A particularly preferred form of formaldehyde is obtained by evaporating aqueous solutions of formaldehyde to obtain a polymer having the formula $(HCHO)_n$ or $HO(CH_2O)_nH$ in which $n$ equals 6+. Such a compound is known as paraformaldehyde and is available in solid form. No matter what form of formaldehyde is employed, at least 6 moles of HCHO per mole of polyalkylbenzene feedstock should be present at the beginning of the chloromethylation reaction. Use of such an excess of formaldehyde in combination with particular HCl concentrations and emulsifier levels serves to minimize chloromethylation reaction time.

The other chloromethylation agent is hydrogen chloride. Hydrogen chloride can likewise be added to the reaction mixture in any aqueous commercially available form. Most commonly, hydrogen chloride is added in the form of hydrochloric acid which is available in a 37–38% HCl aqueous solution. For purposes of the instant invention utilization of anhydrous HCl is not possible in that such material is highly corrosive and would require special expensive reaction equipment. No matter which form of aqueous hydrogen chloride is employed, at least 6 moles of HCl per mole of polyalkylbenzene feed stock must initially be present in the reaction mixture. Again, maintenance of such an excess of hydrogen chloride is an essential element of the instant improved chloromethylation process.

An emulsifier is used in the instant process to ensure proper contact of reactants. Any conventional emulsifier may be employed provided it is stable in acid media. Emulsifiers of the instant invention can be generally classified as nonionic, anionic, ampholytic and zwitterionic. Examples of suitable emulsifiers include polyoxyethylene ether alcohols and polyglycol fatty esters; polyethoxylated fatty acids; alkyl phenoxy poly(ethylenoxy)ethanol; ethoxylated fatty alcohols; polyoxyethylene fatty alcohol ethers; alkyl polyether alcohols; octyl phenyl polyethoxy ethanols; alkyl dimethyl amine oxides such as dodecyldimethylamine oxide, tetradecyldimethylamine oxide and cetyldimethylamine oxide; alkyl esters of alpha-sulfonated fatty acids wherein the fatty acid moiety contains from about 10 to 22 carbon atoms and the alkyl moiety contains from one to about 10 carbon atoms, such as the sodium and tetramethylammonium salts of the hexyl, octyl, ethyl and butyl esters of α-sulfonated tridecanoic acid and pentadecanoic acids; sulfonated fatty acids containing from eight to 18 carbon atoms; olefin sulfonates having from about 12 to about 24 carbon atoms produced by the sulfonation of α-olefins such as the sodium and potassium salts of sulfonated 1-hexadecene, sulfonated 1-dodecene, 1-tetradecene and 1-octadecene and the olefin sulfonates described in U.S. Pat. No. 3,332,880; and zwitterionic surfactants such as 3-(N,N-dimethyl-N-alkylammonium)propane-1-sulfonate wherein the alkyl group contains from about eight to 18 carbon atoms. Preferred emulsifiers are the above-described olefin sulfonates, alpha-sulfonated fatty acid esters and 3-(N,N-dimethyl-N-alkylammonium)propane-1-sulfonates. A highly preferred emulsifier is the sodium salt of a sulfonated α-olefin containing from about 10 to 16 carbon atoms since this surfactant forms an emulsion which provides excellent reactant contact during agitation but which is easily broken to foster reagent recovery after reaction completion.

Emulsifiers are added to the reaction mixture to the extent of from about 0.1 to 4.7 percent by weight of the reaction mixture. At emulsifier concentrations below 0.1 percent, emulsion formation is ineffective and at concentrations above about 4.7 percent, product separation difficulties arise. To reduce reaction time the emulsifier is preferably present in the reaction mixture from the beginning of the reaction.

The instant process is carried out by simply mixing the reactants together in the required concentration and in any suitable reaction vessel. To ensure proper reactant contact and emulsion formation, the reaction mixture must be agitated at all times. Any conventional mixing or agitation device can be employed. The particular type of agitation apparatus will depend upon the amount and type of material being employed as the reaction mixture. Agitation must, however, be sufficient to form a homogenous emulsion.

Chloromethylation is carried out between about 70° and 90° C. A preferred reaction temperature is about 80° C. The instant process is operable at any reaction pressure below 100 psia. Above 100 psia expensive high pressure reaction equipment is necessary, and one of the primary benefits of the invention is thereby lost. Consequently, chloromethylation at pressures above 100 psia fall outside the scope of the present invention. No advantage is obtained by maintaining pressure higher or lower than about atmospheric pressure.

The instant process is carried out without conventional organic cosolvents. An organic cosolvent is, of course, any organic substance such as acetic acid which could be added to the reaction mixture to dissolve reactants (such as the polyalkylbenzene and hydrochloric acid) which would ordinarily be immiscible. Utilization of a particular amount of an emulsifier in combination with reaction mixture agitation avoids the necessity of employing organic cosolvents.

The instant process further is carried out without conventional halomethylation catalysts. These catalytic substances are, of course, materials such as lithium chloride which initiate or promote certain of the steps of halomethylation reaction but are not themselves consumed during the process. Again the particular combination of high reactant mole ratios and reaction conditions of the present invention eliminates the need for such catalytic substances.

The type of chloromethylated product secured from the instant process depends upon the particular polyalkylbenzene feedstock employed. Mono, di, tri, and tetraalkylbenzene compounds yield a mixture of mono and bis-chloromethylated alkylbenzene products, whereas pentaalkylbenzene, of course, yields only mono-chloromethylated product. Monochloromethylation of the penta-substituted feedstock occurs very rapidly under the conditions of the instant process. Within fifteen minutes all of the pentaalkyl feedstock can be converted to the chloromethylated product. Bischloromethylation requires longer reaction time. For example, up to 70 percent of the mono, di, tri or tetraalkyl feedstock can be bis-chloromethylated within several hours. Longer reaction time serves to slowly increase the conversion to the bis-chloromethylated product.

The chloromethylated polyalkylbenzene products of the instant invention are easily recovered from the reaction mixture. Upon cooling the reaction solution below 60° C, product crystals readily form with or without agitation. Such crystals can be readily separated by any conventional separation means such as filtration.

The improved chloromethylation process of the instant invention is illustrated by the following examples:

EXAMPLE I

Pentamethylbenzene was converted to chloromethylpentamethylbenzene under four different sets of reaction conditions. The four different experiments correspond to the four curves on the drawing. The four reactions are described as follows. All reactions were run at atmospheric pressure.

A. Chloromethylation of Pentamethylbenzene at 80° C with High Agitation, HCl:HCHO:Pentamethylbenzene Mole Ratios of 6:6:1 in the Presence of an Emulsifier A 500 milliliter fluted flask, fitted with an agitator, condenser and temperature control unit, was charged with 45 grams of para-formaldehyde and 54.75 grams of HCl as 125 milliliters of a 37 – 38 percent hydrochloric acid solution. This mixture was heated to 40° C and 2 grams of the sodium salt of an α-sulfonated olefin containing about 15 carbon atoms were added as an emulsifier. After heating the mixture to 80° C, 37 grams of pentamethylbenzene were added. The mixture was agitated to form a homogeneous emulsion. Representative samples were taken during the course of the reaction at fifteen minute intervals from the addition of the pentamethylbenzene. These samples were analyzed by gas chromotographic techniques to determine the percentage of pentamethylbenzene which had been converted to monochloromethylbenzene. The extent of monochloromethylation as the reaction proceeded is summarized as follows:

| Time From Addition of Penta methylbenzene | % Pentamethyl benzene Remaining Unchloromethyl ated | % Pentamethylbenzene Converted to Monochloro methylpentamethylbenzene |
|---|---|---|
| ¼ hour | 0.0% | 100% |
| ½ " | 0.0% | 100% |
| 1 " | 0.0% | 100% |
| 1-½ " | 0.0% | 100% |
| 2 " | 0.0% | 100% |

When in Experiment A the olefin sulfonate emulsifier is replaced with polyoxyethylene sorbitan (20) monostearate, a tridecyl polyethylene glycol ether available commercially as Tergitol 3-A-6, an octyl phenoxy polyethoxy ethanol available commercially as Triton X-45, an alkyl polyether alcohol available commercially as Triton X-67, the condensation product of fatty acid with ethylene oxide available commercially as Cirrasol FP, the condensation product of fatty alcohol with ethylene oxide available commercially as Cirrasol SF 200, tetradecyldimethylamine oxide, the sodium salt of the ethyl ester of α-sulfonated pentadecanoic acid or 3-(N,N-dimethyl-N-hexadecylammonium)propane-1-sulfonate in substantially similar amounts, comparable chloromethylation results are obtained.

When in Experiment A the 37 – 38 percent hydrochloric acid is replaced with a 20 percent aqueous HCl solution to provide an equivalent number of moles of HCl in the reaction mixture and the para-formaldehyde is replaced with enough formalin to provide an equivalent number of moles of HCHO in the reaction mixture, substantially similar chloromethylation results are obtained.

When in Experiment A, the pentamethylbenzene is replaced with pentapropylbenzene or 1,3-diethyl-4-butyl-5-methylbenzene, substantially similar conversion to a monochloromethylated product occurs.

B. Chloromethylation of Pentamethylbenzene at 80° C. with High Agitation, HCl:HCHO:Pentamethylbenzene Mole Ratios of 6:6:1 and No Emulsifier A 500 milliliter flask, fitted as in Experiment A with condenser, agitator and temperature control unit, was charged with 45 grams of para-formaldehyde and 54.75 grams of HCl as 125 milliliters of 37 – 38 percent hydrochloric acid. AFter heating the mixture to 80° C, 37 grams of pentamethylbenzene were added. The mixture was agitated to maintain complete and constant mixing of the oily organic and water-inorganic phases. Representative samples from the hydrocarbon phase were again taken and analyzed as in Experiment A.

| Time From Addition of Penta methylbenzene | % Pentamethyl benzene Remaining Unchloromethyl ated | % Pentamethylbenzene Converted to Monochloro methylpentamethylbenzene |
|---|---|---|
| ¼ hour | 76.5% | 23.5% |
| ½ " | 60.9% | 39.1% |
| ¾ " | 35.4% | 64.6% |
| 1 " | 20.6% | 79.4% |
| 1-½ " | 11.5% | 88.5% |
| 1-¾ " | 7.6% | 92.4% |
| 2 " | 4.3% | 95.7% |

C. Chloromethylation of Pentamethylbenzene at 80° C with High Agitation, HCl:HCHO:Pentamethylbenzene Mole Ratios of 3:3:1 in the presence of an Emulsifier A three-neck flask, fitted with a condenser, agitator and temperature control unit was charged with 22.5 grams of para-formaldehyde and 27.38 grams of HCl as 37 – 38 percent hydrochloric acid diluted to 125 ml. and heated to 30° C. After heating to 63° C, 2 grams of the sodium salt of an α-sulfonated olefin containing about 15 carbon atoms were added. The mixture was then heated to 80° C. 37 Grams of pentamethylbenzene were added, and the mixture was agitated to form a homogeneous emulsion. Representative samples from the emulsions were taken at 4 minute intervals from the addition of the pentamethylbenzene. Some of these samples were then analyzed as in Experiment A to determine the extent to which pentamethylbenzene had been chloromethylated during the reaction. Results of these analyses are summarized as follows:

| Time From Addition of Penta methylbenzene | % Pentamethyl benzene Remaining Unchloromethyl ated | % Pentamethylbenzene Converted to Monochloro methylpentamethylbenzene |
|---|---|---|
| 4 minutes | 85.0% | 15.0% |
| 8 " | 80.5% | 19.5% |
| 16 " | 65.9% | 34.1% |
| 60 " | 58.1% | 41.9% |
| 120 " | 43.7% | 56.3% |

D. Chloromethylation of Pentamethylbenzene at 80° C with Low Agitation, HCl:HCHO:Pentamethylbenzene Mole Ratios of 6:6:1 and No Emulsifier A 500 milliliter flask, fitted with a condenser, agitator and temperature control unit, was charged with 45.0 grams of para-formaldehyde and 125 milliliters of 37 – 38 percent hydrochloric acid (54.75 grams HCl). 37.0 grams of pentamethylbenzene were added while the reaction mixture was maintained at a temperature of 80° C. The mixture was agitated so that two liquid phases were present, but within each phase the liquid was thoroughly mixed. Representative samples from the hydrocarbon phase were taken at 15 minute intervals from the addition of the pentamethylbenzene. These samples were analyzed as in Experiment A. The extent of monochloromethylation as the reaction proceeded is summarized as follows:

| Time From Addition of Penta methylbenzene | % Pentamethyl benzene Remaining Unchloromethyl ated | % Pentamethylbenzene Converted to Monochloro methylpentamethylbenzene |
|---|---|---|
| ¼ Hour | 99.6% | 0.4% |
| ½ " | 98.5% | 1.5% |
| ¾ " | 96.6% | 3.4% |
| 1 " | 96.0% | 4.0% |
| 1-¼ " | 94.2% | 5.8% |
| 1-½ " | 93.8% | 6.2% |
| 1-¾ " | 78.6% | 21.4% |
| 2 " | 96.9%* | 3.1%* |
| 2-¼ " Shutdown | 74.9% | 25.1% |

* Believed to be a non-representative sample.

Example I clearly demonstrates the importance of each element of the instant chloromethylation process. As can be seen from the drawing and the Example, only the chloromethylation process of the present invention (Experiment A) wherein the emulsifier, agitation and requisite reactant mole ratios are present provides complete monochloromethylation within fifteen minutes. Experiment D demonstrates that utilization of high reactant mole ratios alone provides very poor monochloromethylation. Experiment C demonstrates that utilization of an emulsification agent and high agitation does not substantially improve the effectiveness of chloromethylation if lower reactant concentrations are employed. Experiment B demonstrates that even highly agitated systems with the requisite reactant concentrations are not as effective for chloromethylation processes as the present invention if the emulsifier is absent.

EXAMPLE II

Bis-Chloromethylation of Pseudocumene (1,2,4-Trimethyl Benzene)

A 5-liter flask was fitted with two condensers, agitation apparatus and temperature control apparatus and charged with 960 grams of para-formaldehyde and 1,168 grams of HCl as 2,667 milliliters of 37 – 38 percent hydrochloric acid. This mixture was heated to 80° C and 480 grams of pseudocumene were added at atmospheric pressure. The reaction mixture was agitated so that the oily and aqueous layers were thoroughly contacted. After six hours the reaction was stopped by cooling and ceasing to agitate the reaction mixture. A sample from the mixture was then analyzed using conventional gas chromatographic procedures. It was found that 38.2 percent of the pseudocumene had been converted to a monochloromethylated trimethylbenzene product and 61.8 percent of the pseudocumene had been converted to a bis-chloromethylated trimethylbenzene product.

The reaction mixture was then reheated to 80° C and agitated for 7 more hours. Again the reaction was stopped by cooling and ceasing agitation and a sample analyzed. At this point. 34.8 percent of the pseudocumene had been converted to a monochloromethylated trimethylbenzene and 65.2 percent to bis-chloromethylated trimethylbenzene.

17.5 grams of the sodium salt of an α-sulfonated olefin containing about 15 carbon atoms were then added to the reaction mixture and the reaction mixture was again agitated to form a homogeneous emulsion and heated to 80° C. After 3 hours, the reaction was again stopped and the reaction mixture analyzed. In the final reaction product, 23.8 percent of the pseudocumene had been converted to monochloromethylated trimethylbenzene and 76.2 percent had been converted to a bis-chloromethylated benzene.

When in the above Example II, the emulsifier is added with the initial pseudocumene charge, about 75 percent of the pseudocumene is bis-chloromethylated after at least seven fewer hours of reaction time.

When in the above Example II, the pseudocumene is replaced with benzene; toluene; 1,2-dimethylbenzene; 1,3-dimethylbenzene; 1,3,5-trimethylbenzene; 1,2,3-trimethylbenzene; 1-chloromethyl-3,5-dimethyl-benzene; 1,3,5-triethylbenzene; 1,2,4-tripropylbenzene; 1,2,3-tributylbenzene; 1,2,3-trimethyl-4-chloromethylbenzene or 3-butylbenzene, substantially similar conversion to a mixture of mono- and bis-chloromethylated products occurs.

When in Example II the olefin sulfonate emulsifier is replaced with polyoxyethylene sorbitan (20) monostearate, a tridecyl polyethylene glycol ether available commercially as Tergitol 3-A-6, an octyl phenoxy polyethoxy ethanol available commercially as Triton X-45, an alkyl polyether alcohol available commercially as Triton X-67, the condensation product of fatty acid with ethylene oxide available commercially as Cirrasol FP, the condensation product of fatty alcohol with ethylene oxide available commercially as Cirrasol SF 200 tetradecyldimethylamine oxide, the sodium salt of the ethyl ester of α-sulfonated pentadecanoic acid or 3-(N,N-dimethyl-N-hexadecylammonium)-propane-1-sulfonate in substantially similar amounts, comparable chloromethylation results are obtained.

When in Example II the 37 – 38 percent hydrochloric acid is replaced with a 20 percent aqueous HCl solution to provide an equivalent number of moles of HCl in the reaction mixture and the para-formaldehyde is replaced with enough formalin to provide an equivalent number of moles of HCHO in the reaction mixture, substantially similar chloromethylation results are obtained.

Example II again clearly demonstrates the effectiveness of the particular combination of elements of the present invention in bis-chloromethylation of aromatic hydrocarbons. The importance of the emulsifier can be seen by noting that after seven hours of reaction time without the emulsifier produced only an additional 3.4 percent conversion to the bis-chloromethylated product, addition of the emulsifier resulted in an 11 percent increase in bis-chloromethylation after only three hours reaction time.

What is claimed is:

1. A process for the preparation of mono- and bis-chloromethylated polyalkylbenzene compounds comprising the steps of:
    A. forming a reaction mixture consisting of:
        1. an aromatic hydrocarbon having the general formula

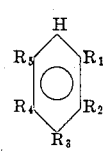

wherein $R_1$, $R_2$, $R_3$, $R_4$ and $R_5$ are, independently, hydrogen, alkyl of from one to about five carbon atoms, or haloalkyl of from one to about five carbon atoms, no more than one of the R groups being haloalkyl,
        2. at least 6 moles of HCHO per mole of aromatic hydrocarbon,
        3. at least 6 moles of HCl per mole of aromatic hydrocarbon, said HCl being in the form of an aqueous solution, and
        4. an emulsifier which is stable in acid media, said emulsification agent comprising from about 0.1 to 4.7 percent by weight of the total reaction mixture; and
    B. agitating the reactants to form a homogeneous emulsion while maintaining the reaction mixture at a temperature of from about 70° to 90° C and a pressure below 100 psia.

2. A process in accordance with claim 1 wherein the aromatic hydrocarbon is selected from the group consisting of pentamethylbenzene; toluene; 1,2-dimethylbenzene; 1,3-dimethylbenzene; 1,2,4-trimethylbenzene; 1,3,5-trimethyl-benzene, 1,2,3-trimethylbenzene; 1,2,4,5-tetramethylbenzene; 1,2,3,4-tetramethylbenzene; 1-chloromethyl-3,5-dimethylbenzene; and 1,2,3-trimethyl-4-chloromethylbenzene.

3. A process in accordance with claim 1 wherein the aromatic hydrocarbon is pentamethylbenzene.

4. A process in accordance with claim 2 wherein the emulsifier is selected from the group consisting of olefin sulfonates containing from about 12 to 24 carbon atoms, alkyl esters of alpha-sulfonated fatty acids wherein the fatty acid moiety contains from about 10 to 22 carbon atoms and the alkyl moiety contains from one to about 10 carbon atoms, and 3-(N,N-dimethyl-N-alkylammonio)propane-1-sulfonate wherein the alkyl radical contains from about eight to 18 carbon atoms.

5. A process in accordance with claim 2 wherein the HCHO is para-formaldehyde, the HCl is in the form of 37–38 percent aqueous solution and the emulsifier is the sodium salt of a sulfonated α-olefin containing from about 10 to 16 carbon atoms.

6. A process in accordance with claim 5 wherein the aromatic hydrocarbon is pentamethylbenzene.

* * * * *